United States Patent
Palmer (10) Patent No.: US 10,946,443 B2
(45) Date of Patent: Mar. 16, 2021

(54) REMOVAL OF UNFUSED POWDER FROM AN ADDITIVE-MANUFACTURED PART USING PIEZOELECTRIC TRANSDUCERS

(71) Applicant: Hamilton Sundstrand Corporation, Charlotte, NC (US)

(72) Inventor: Nigel Palmer, West Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 451 days.

(21) Appl. No.: 15/864,265

(22) Filed: Jan. 8, 2018

(65) Prior Publication Data

US 2019/0210107 A1 Jul. 11, 2019

(51) Int. Cl.
| | |
|---|---|
| *B22F 3/24* | (2006.01) |
| *B22F 3/105* | (2006.01) |
| *B08B 7/02* | (2006.01) |
| *B29C 64/35* | (2017.01) |
| *B33Y 40/00* | (2020.01) |
| *B33Y 30/00* | (2015.01) |
| *B29C 64/40* | (2017.01) |
| *B22F 5/04* | (2006.01) |
| *B23P 15/02* | (2006.01) |

(52) U.S. Cl.
CPC ............ *B22F 3/1055* (2013.01); *B08B 7/026* (2013.01); *B22F 3/24* (2013.01); *B22F 5/04* (2013.01); *B23P 15/02* (2013.01); *B29C 64/35* (2017.08); *B29C 64/40* (2017.08); *B33Y 30/00* (2014.12); *B33Y 40/00* (2014.12); *B22F 2003/1059* (2013.01); *B22F 2003/247* (2013.01)

(58) Field of Classification Search
CPC ......... B33Y 40/20; B33Y 50/00; B33Y 50/02; B29C 64/35; B29C 64/40; B08B 7/026; B08B 7/02; B08B 7/028; B22F 3/24; B22F 2003/247; B22F 2003/1059; B22F 5/04
USPC ........................................................ 264/344
See application file for complete search history.

(56) References Cited

U.S. PATENT DOCUMENTS

| | | | |
|---|---|---|---|
| 6,814,823 B1 * | 11/2004 | White | B23P 15/00 156/73.1 |
| 2004/0148048 A1 * | 7/2004 | Farnworth | B33Y 40/00 700/119 |
| 2016/0074940 A1 | 3/2016 | Cote et al. | |
| 2017/0036401 A1 | 2/2017 | Donovan et al. | |
| 2017/0232670 A1 | 8/2017 | Joerger et al. | |

FOREIGN PATENT DOCUMENTS

| | | |
|---|---|---|
| EP | 3053731 A1 | 8/2016 |
| EP | 3199269 A1 | 8/2017 |
| EP | 3257607 A1 | 12/2017 |

OTHER PUBLICATIONS

Extended European Search Report for European Patent Application No. 19150806.8, dated May 31, 2019, 9 pages.

\* cited by examiner

*Primary Examiner* — Jeffrey M Wollschlager
*Assistant Examiner* — Xue H Liu
(74) *Attorney, Agent, or Firm* — Kinney & Lange, P.A.

(57) ABSTRACT

Removing unfused powder from internal passages of an additive-manufacture part includes attaching piezoelectric transducers to a plurality of locations on an exterior of the part. The part is vibrated by driving the piezoelectric transducers at varying amplitudes and frequencies. An amount of the unfused powder that exits the part is monitored.

17 Claims, 6 Drawing Sheets

REMOVAL OF UNFUSED POWDER FROM AN ADDITIVE-MANUFACTURED PART USING PIEZOELECTRIC TRANSDUCERS

BACKGROUND

The present disclosure relates generally to post processing of additive-manufactured parts, and more particularly to the use of piezoelectric transducers to remove unfused powder from an additive-manufactured part.

Additive manufacturing techniques can be used to build parts in a layer-by-layer fashion to arrive at a monolithic structure, thereby reducing or eliminating the need for complex casting, machining, and fabrication operations. Such additive manufacturing techniques typically involve the deposition of a thin layer of powder material (e.g., metal powder) on a work stage. A portion of the layer is solidified using, e.g., selective laser sintering, direct metal laser sintering, or selective laser melting according to a three-dimensional (3D) computer model of the part. The solidified portions of the layer form a cross-section of the part at a corresponding elevation defined by the 3D computer model. The work stage is subsequently lowered and a new layer of powder material is introduced, portions of which are solidified to produce the cross-section of the part at the new elevation according to the 3D model. The work stage lowering and selective solidification are repeated until the final structure of the finished part is achieved.

Additive manufacturing techniques can be used to form complex parts having numerous internal walls, passages, cavities, or other components. Such internal components typically require the post-processing removal of residual (i.e., unfused) powder prior to disposition and ultimate use of the part. It can be difficult, however, to remove residual powder from the interior of complex parts having numerous internal passages that may be narrow, winding, terminating at a dead end within the part, or otherwise prone to trapping residual powder. In some cases, the inability to remove residual powder from a finished part can render the use of additive manufacturing techniques unfeasible for production of the part.

SUMMARY

In one example, a method of removing unfused powder from internal passages of an additive-manufactured part includes attaching piezoelectric transducers to a plurality of locations on an exterior of the part. The method further includes vibrating the part by driving the piezoelectric transducers at varying amplitudes and frequencies, and monitoring an amount of the unfused powder that exits the part.

In another example, a method includes attaching a plurality of piezoelectric transducers to a plurality of locations of an exterior of an additive-manufactured part having internal passages terminating at one or more open ends at the exterior of the part. The method further includes vibrating the part by driving the plurality of piezoelectric transducers at varying amplitudes and frequencies, and monitoring an amount of unfused powder that exits the one or more open ends at the exterior of the part. The method further includes, in response to determining that the amount of unfused powder that exits the one or more open ends exceeds a threshold deviation from an estimated amount of unfused powder contained within the internal passages of the part: changing at least one of an orientation of the part and locations of one or more of the plurality of piezoelectric transducers; and repeating the vibrating and monitoring steps by driving the plurality of piezoelectric transducers at the varying amplitudes and frequencies and monitoring the amount of unfused powder that exits the one or more open ends at the exterior of the part. The method further includes, in response to determining that the amount of unfused powder that exits the one or more open ends does not exceed the threshold deviation from the estimated amount of unfused powder contained within the internal passages of the part, creating a defined schedule of frequency changes, amplitude changes, orientation changes, and transducer locations associated with the part.

In another example, a system includes an additive-manufacture part comprising a plurality of internal passages, a plurality of piezoelectric transducers, an electronic function generator, and a computer. The plurality of piezoelectric transducers are attached to a plurality of locations on an exterior of the additive-manufactured part. The electronic function generator is electrically coupled to each of the plurality of piezoelectric transducers. The computer is communicatively coupled with the electronic function generator and is encoded with computer-readable instructions that cause the computer to control the electronic function generator to drive the plurality of piezoelectric transducers at varying amplitudes and frequencies to vibrate the additive-manufactured part.

DETAILED DESCRIPTION

As described herein, piezoelectric transducers can be utilized for the removal of residual (i.e., unfused) powder from internal passages of an additive-manufactured part. The piezoelectric transducers are attached to an exterior of the part and driven at varying amplitudes and frequencies to induce vibration of the part to dislodge residual powder from the internal passages. An orientation of the part and/or locations of the transducers can be altered to facilitate movement of the residual powder within the interior passages to an opening that terminates at the exterior of the part. The sequence of orientation and/or transducer location changes can be determined based on orientations of the internal passages defined by a three-dimensional (3D) computer model of the part, such as a computer-aided design (CAD) file, an Additive Manufacturing File (AMF), or other computer model defining the 3D structure of the part.

An amount of unfused powder that exits the part during the vibration operations is monitored, and can be compared to an estimated amount of residual powder contained within the internal passages, such as an amount of residual powder corresponding to a volume of the internal passages (e.g., estimated based on the 3D computer model). A defined schedule of frequency changes, amplitude changes, orientation changes, and transducer locations is created based on the operations that produced an amount of unfused powder exiting the part that is within a threshold deviation (e.g., a threshold volume, weight, percentage of material, or other threshold deviations) from the estimated amount of residual powder contained within the internal passages. Subsequent additive-manufactured versions of the part can then be subjected to the defined schedule to effectively remove the unfused powder from the additive-manufactured part.

Accordingly, techniques of this disclosure can be utilized to remove residual (i.e., unfused) powder from internal passages of an additive-manufactured part. The techniques can effectively remove unfused powder from passages that may be narrow, winding, terminating at a closed end (i.e., a dead end) within the part, or otherwise prone to trapping residual powder. As such, techniques described herein can help to remove residual powder from the additive-manufactured part that may otherwise render the use of additive manufacturing techniques unfeasible for production of the part.

Figure 1A:
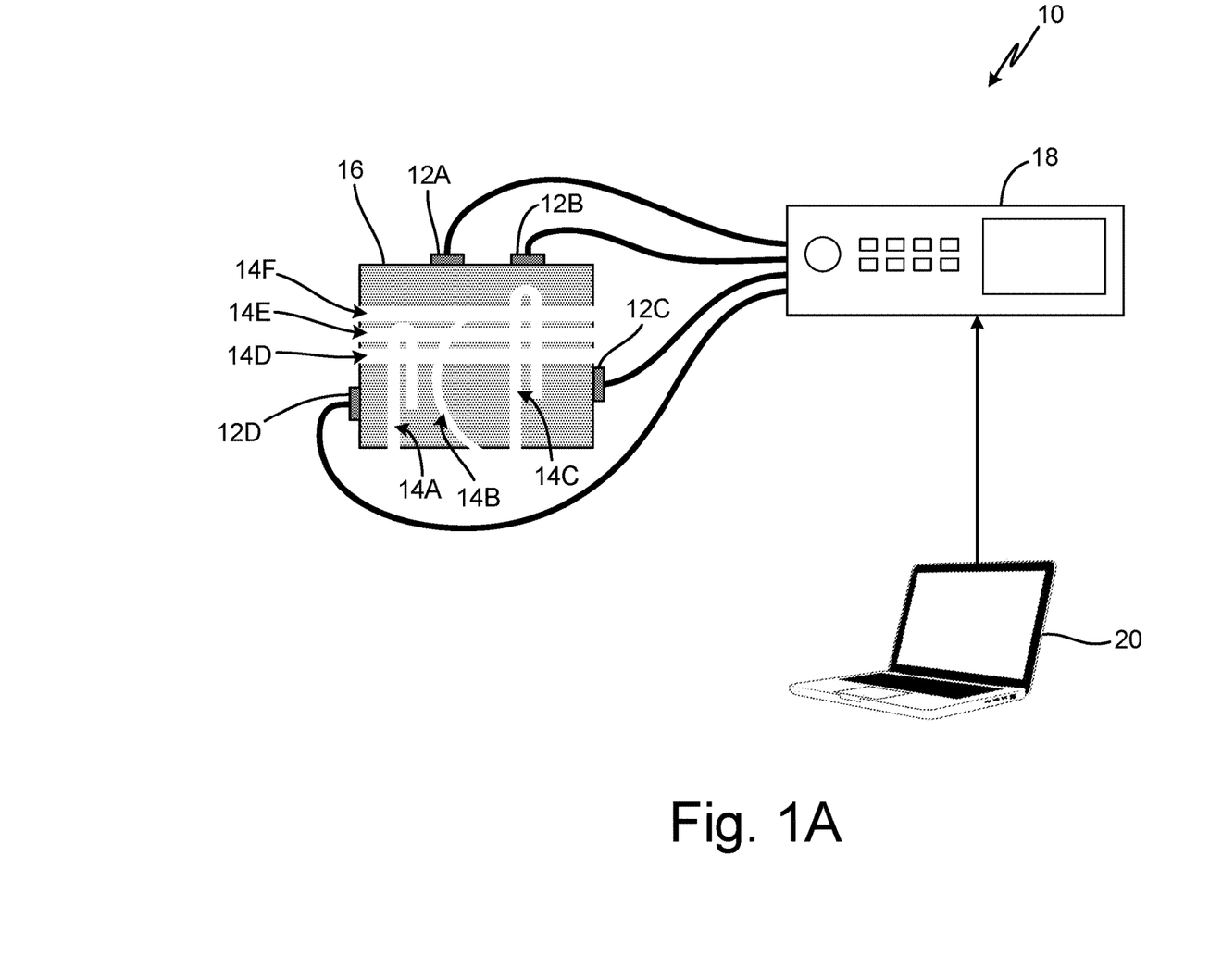
FIGS. 1A-1D are schematic diagrams of an example system including piezoelectric transducers that can be used to remove unfused powder from internal passages of an additive-manufactured part illustrated at varying orientations.
Figure 1B:
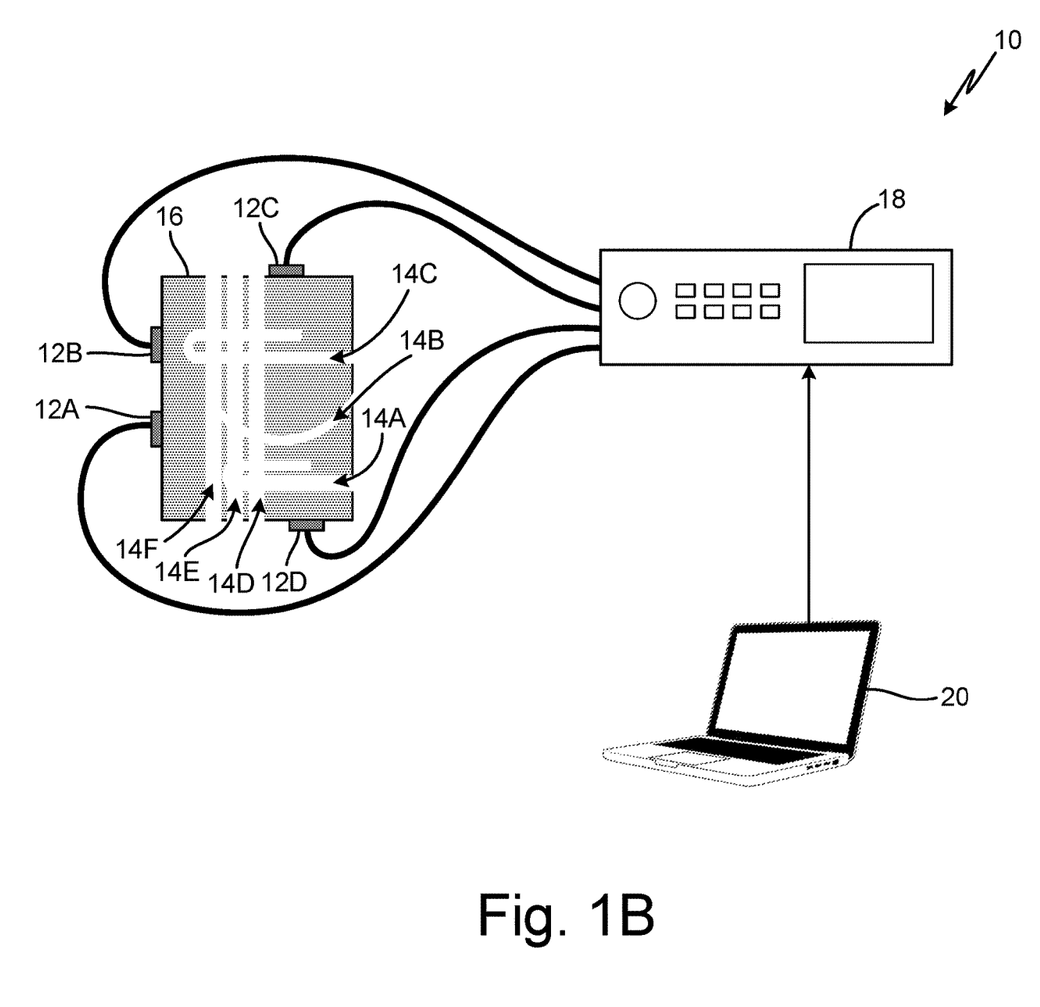
Figure 1C:
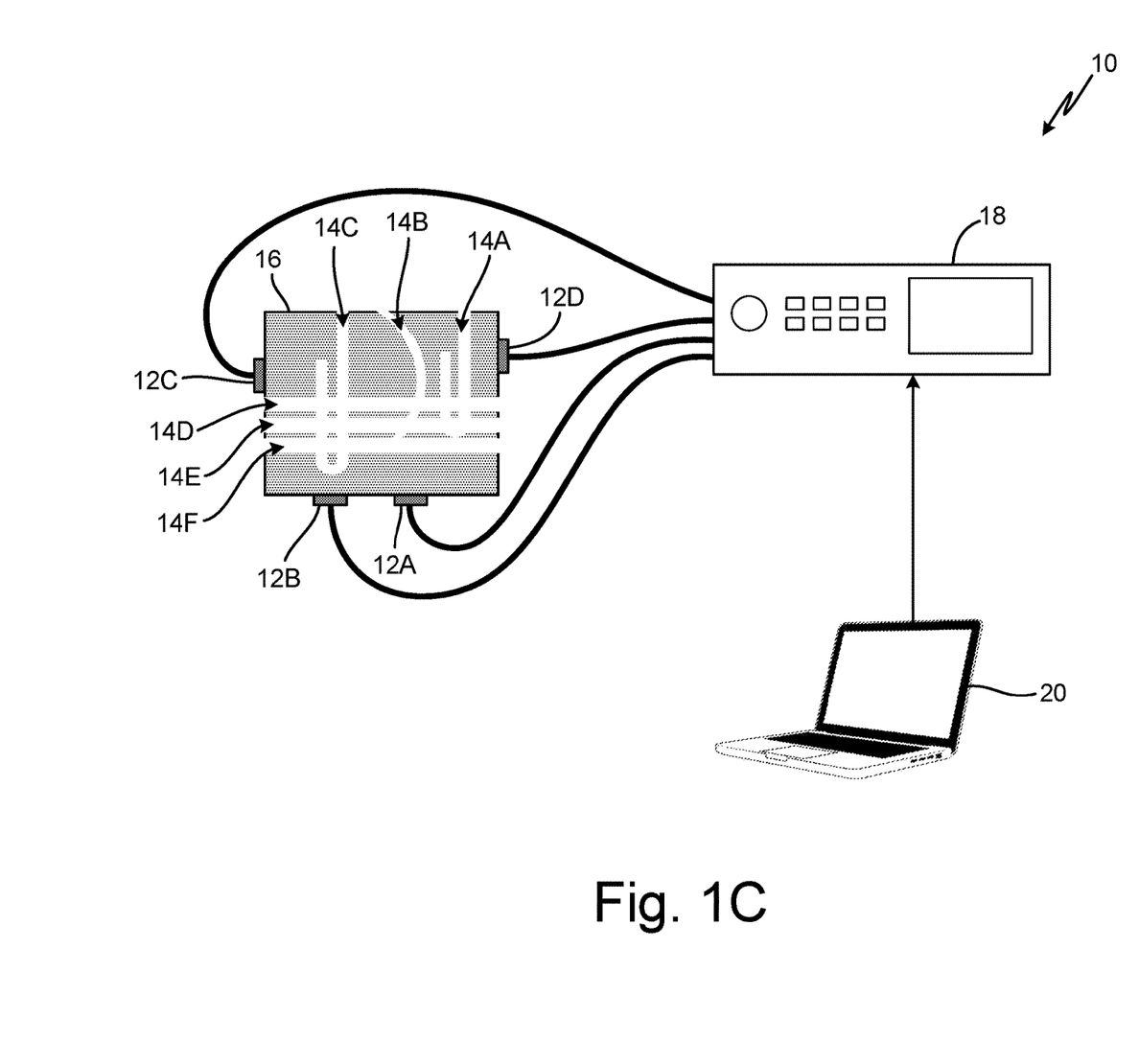
Figure 1D:
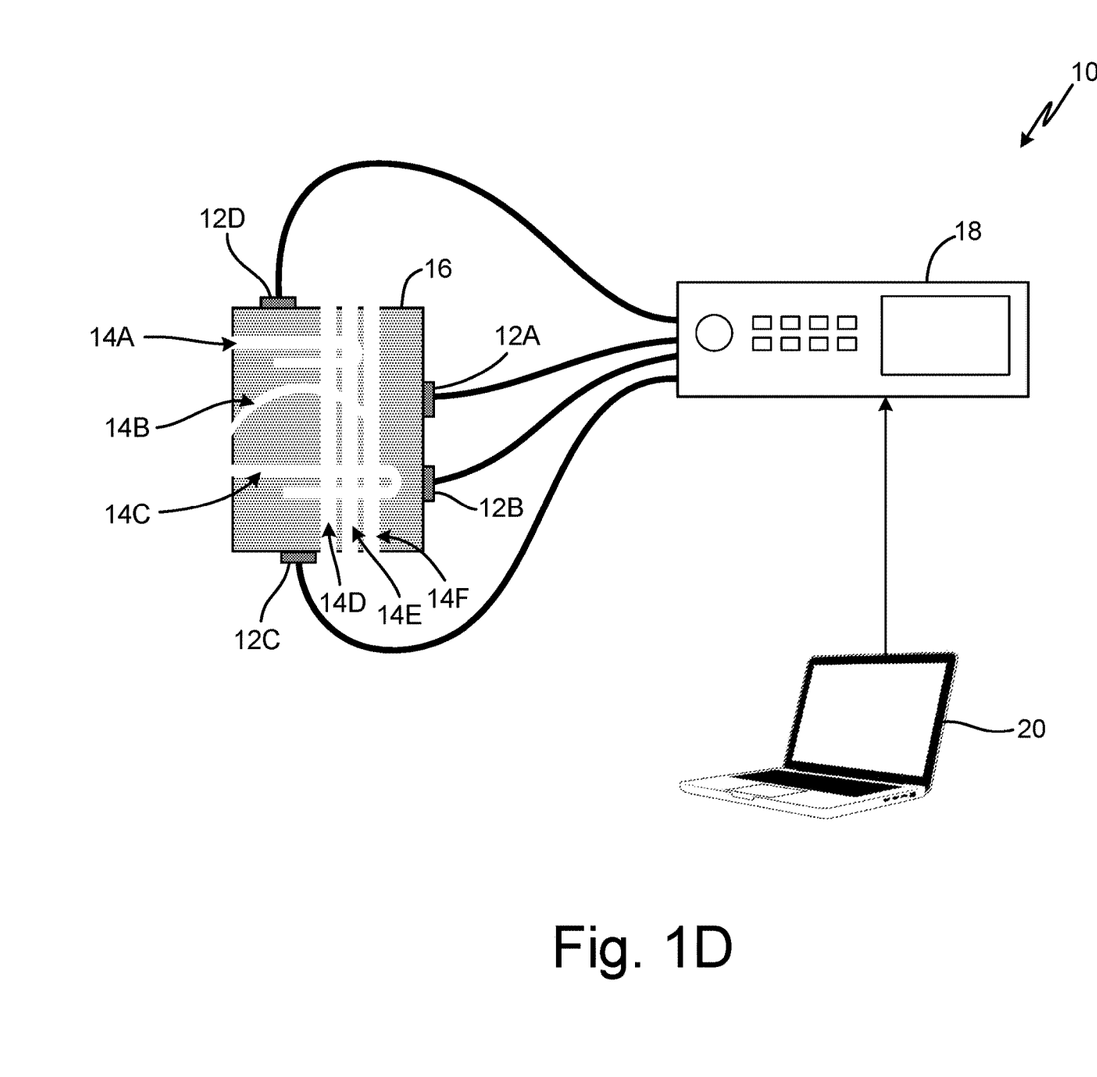

FIGS. 1A-1D are schematic diagrams of system 10 including piezoelectric transducers 12A-12D that can be used to remove unfused powder from internal passages 14A-14F of additive-manufactured part 16. FIGS. 1A-1D illustrate system 10 having additive-manufactured part 16 disposed at varying orientations. That is, FIG. 1A illustrates additive-manufactured part 16 at a first orientation, and FIGS. 1B-1D illustrate additive-manufactured part 16 rotated by successive 90 degree increments. Though the examples of FIGS. 1A-1D illustrate additive-manufactured part 16 rotated by successive 90 degree increments, it should be understood that additive-manufactured part 16 can be rotated by other increments within any of combination of six degrees of rotational freedom.

As illustrated in FIG. 1A, system 10 further includes electronic function generator 18 and computer 20. Additive-manufactured part 16 can be any additive-manufactured part having internal passages, cavities, or other components that may contain residual (i.e., unfused) powder, such as metal powder or other material used for the additive-manufacture of part 16. In some examples, additive-manufactured part 16 is a component used by an aircraft, such as a heat exchanger (e.g., a plate-fin heat exchanger), an airfoil (e.g., rotor blade, fan blade, or other airfoil) used in a gas turbine engine of the aircraft, or other component having internal passages that may contain residual powder after the additive-manufacture of the part.

Internal passages 14A-14F are internal passageways (e.g., extending within an interior) of additive-manufactured part 16 that terminate in at least one open end at an exterior of additive-manufactured part 16. Internal passages 14A-14F can be, in some examples, narrow passages (e.g., less than one millimeter in width) having thin walls (e.g., less than one millimeter in width). As illustrated in FIG. 1A, internal passages 14A-14F can be linear (e.g., passages 14D, 14E, and 14F), curvilinear (e.g., passages 14A, 14B, and 14C), and may intersect at one or more locations. In addition, as illustrated in FIG. 1A, any one or more of internal passages 14A-14F can terminate at a closed end (e.g., a dead end) within the interior of additive-manufactured part 16 (e.g., passages 14A and 14C). Though the examples of FIGS. 1A-1D illustrate a schematic cutaway view of additive-manufactured part 16 to more clearly show internal passages 14A-14F, it should be understood that additive-manufactured part 16 is a three-dimensional part, and internal passages 14A-14F are also three-dimensional in nature.

Piezoelectric transducers 12A-12D are electroacoustic transducers, such as quartz piezoelectric crystal transducers, piezoelectric ceramic transducers, piezo-polymer transducers, piezoelectric ultrasonic transducers, or other types of piezoelectric transducers. Function generator 18 is an electronic device capable of generating various types of waveforms (e.g., sine wave, square wave, triangular wave, sawtooth wave, or other types of waveforms) at various frequencies and amplitudes (e.g., according to a selectable power level). Computer 20 is a general purpose computer or other computerized controller having one or more processors, one or more input/output devices (e.g., communication devices, user interface devices, or other input/output devices), and computer-readable memory encoded with instructions that, when executed by the one or more processors, cause computer 20 to execute in accordance with techniques described herein.

As illustrated in FIG. 1A, piezoelectric transducers 12A-12D are attached to locations on the exterior of additive-manufactured part 16. While the examples of FIGS. 1A-1D illustrate and describe the use of four individual piezoelectric transducers, it should be understood that techniques described herein are applicable to the use of any number of one or more piezoelectric transducers.

Function generator 18 is electrically connected to each of piezoelectric transducers 12A-12D to supply electrical waveforms (e.g., sine, square, triangle, sawtooth, or other waveforms) to piezoelectric transducers 12A-12D at varying amplitudes and frequencies. Computer 20, in the examples of FIGS. 1A-1D, is electrically and/or communicatively coupled to function generator 18. In some examples, computer 20 can control operation of function generator 18 to cause function generator 18 to supply the electrical waveforms at the varying amplitudes and frequencies. In other examples, computer 20 may not be coupled with function generator 18. Rather, in such examples, function generator 18 can be manually adjusted by an operator via a user interface of function generator 18 (e.g., knobs, buttons, touch-screen user interface, or other user interface elements) to supply the electrical waveforms at the varying amplitudes and frequencies.

In operation, piezoelectric transducers 12A-12D are attached at various locations of the exterior of additive-manufactured part 16 and are driven to induce vibrations at varying amplitudes and frequencies by electrical waveforms supplied by function generator 18. Vibration of piezoelectric transducers 12A-12D induces vibration of additive-manufactured part 16, including internal components such as walls of internal passages 14A-14F. The induced vibrations can dislodge unfused powder contained within internal passages 14A-14F that can be vibrated to exit open ends of internal passages 14A-14F at the exterior of additive-manufactured part 16.

Function generator 18 drives piezoelectric transducers 12A-12D at varying frequencies and amplitudes (e.g., according to a selected electrical power level of function generator 18). For instance, function generator 18 can drive piezoelectric transducers 12A-12D through a range of frequencies at a first power level (i.e., defining a first amplitude), adjust the electrical input to a second power level (i.e., defining a second amplitude), and drive piezoelectric transducers 12A-12D through the range of frequencies at the second power level. Function generator 18 can repeat the process of setting electrical power levels and scanning frequencies to drive piezoelectric transducers 12A-12D through a range of electrical power levels (corresponding to a range of amplitudes) and frequencies. The ranges of power levels and frequencies utilized by function generator 18 can vary according to the size, material, and type of additive-manufactured part 16. For instance, the range of power levels can vary from electrical power levels on the order of Watts (W) to milliwatts (mW), and the range of frequencies can vary from frequencies on the order of Hertz (Hz) to megahertz (MHz).

Vibration of additive-manufactured part 16 induced by piezoelectric transducers 12A-12D can excite resonant frequencies of walls of internal passages 14A-14F to cause unfused powder to travel through internal passages 14A-14F and exit additive-manufactured part 16. Locations of piezoelectric transducers 12A-12D and/or orientation changes of additive-manufactured part 16 can be based on known orientations and/or paths of internal passages 14A-14F. For instance, computer 20 can store a 3D computer model of additive-manufactured part 16 from which orientations and/or paths of internal passages 14A-14F can be identified. Locations of piezoelectric transducers 12A-12D can be selected and/or changed based on the known orientations and/or paths of internal passages 14A-14F to facilitate movement of residual powder and exit of the powder from additive-manufactured part 16.

As an example, it can be determined (e.g., manually and/or programmatically) that internal passage 14A has a first, open end that terminates at the exterior of additive-manufactured part 16, a second, closed end that terminates within the interior of additive-manufactured part 16, and an orientation change of the path of internal passage 14A between the open end and the closed end. In response, any one or more of piezoelectric transducers 12A-12D can be first attached at a location of the exterior of additive-manufactured part 16 that causes vibration of the walls of internal passage 14A near to the open end (e.g., locations near to and/or on opposite sides of the open end), thereby causing unfused powder to exit additive-manufactured part 16 from the open end when driven to vibrate by function generator 18. The locations of one or more of piezoelectric transducers 12A-12D can be subsequently changed to cause vibration of the walls of internal passage 14A near to the closed end, thereby dislodging and causing movement of residual powder contained within internal passage 14A in a direction from the closed end to the open end to facilitate exit of the residual powder from additive-manufactured part 16.

Such location changes of piezoelectric transducers 12A-12D (an example of which is illustrated and described below with respect to FIG. 2), can be performed in combination with orientation changes of additive-manufactured part 16 to help facilitate the movement of unfused powder through internal passages 14A-14F to exit additive-manufactured part 16. For instance, the orientation of additive-manufactured part 16 can be changed based on the known orientations and paths of internal passages 14A-14F to align open ends of internal passages 14A-14F with gravity (i.e., such that the open ends face the ground) to facilitate movement of the unfused powder through portions of internal passages 14A-14F and the eventual exit of the powder through the open ends.

Orientation changes of additive-manufactured part 16 can be performed manually (e.g., hand held) or accomplished via a manually and/or programmatically controlled fixture that secures additive-manufactured part 16. For example, additive-manufactured part 16 can be secured within a fixture (not shown) that has, e.g., six degrees of rotational freedom to enable accurate and repeatable orientation changes of additive-manufactured part 16. Such a fixture can be manually operated (e.g., by a user) and/or controlled programmatically for orientation changes, such as by computer 20 or other computerized controller.

The amount of unfused powder that exits additive-manufactured part 16 is monitored. For instance, the amount of unfused powder that exits additive-manufactured part 16 can be collected and monitored for weight, volume, or other indication of the amount of the unfused powder that has exited additive-manufactured part 16 during the vibration operations. The amount of unfused powder that has exited can be compared to an estimated amount of unfused powder contained within internal passages 14A-14F. The estimated amount of unfused powder contained within internal passages 14A-14F can be determined based on the 3D computer model of additive-manufactured part 16, such as an amount corresponding to (e.g., equal to or within a defined percentage of) the volume of internal passages 14A-14F.

In response to determining that the amount of unfused powder that exits additive-manufactured part 16 is within a threshold deviation from the estimated amount of unfused powder contained within internal passages 14A-14F (e.g., a threshold weight deviation, a threshold volume deviation, a percentage of weight and/or volume deviation, or other deviations), a defined schedule of frequency changes of the input signal provided to piezoelectric transducers 12A-12D, amplitude changes of the input signal provided to piezoelectric transducers 12A-12D, orientation changes of additive-manufactured part 16, and location changes of piezoelectric transducers 12A-12D can be created. Subsequent additive-manufactured versions of additive-manufactured part 16 can be subjected to the defined schedule to effectively remove the unfused powder from internal passages of the subsequent part.

Accordingly, system 10 implementing techniques of this disclosure can be utilized to remove unfused powder from internal passages 14A-14F from additive-manufactured part 16, including those internal passages that may be narrow, include changes of orientation and/or direction, terminate at a closed end within additive-manufactured part 16, or are otherwise prone to trapping unfused powder. The techniques can therefore help to increase the feasibility of manufacturing parts via additive manufacturing techniques by removing unfused powder that may otherwise render the use of additive manufacturing techniques unfeasible for production of the part.

Figure 2:
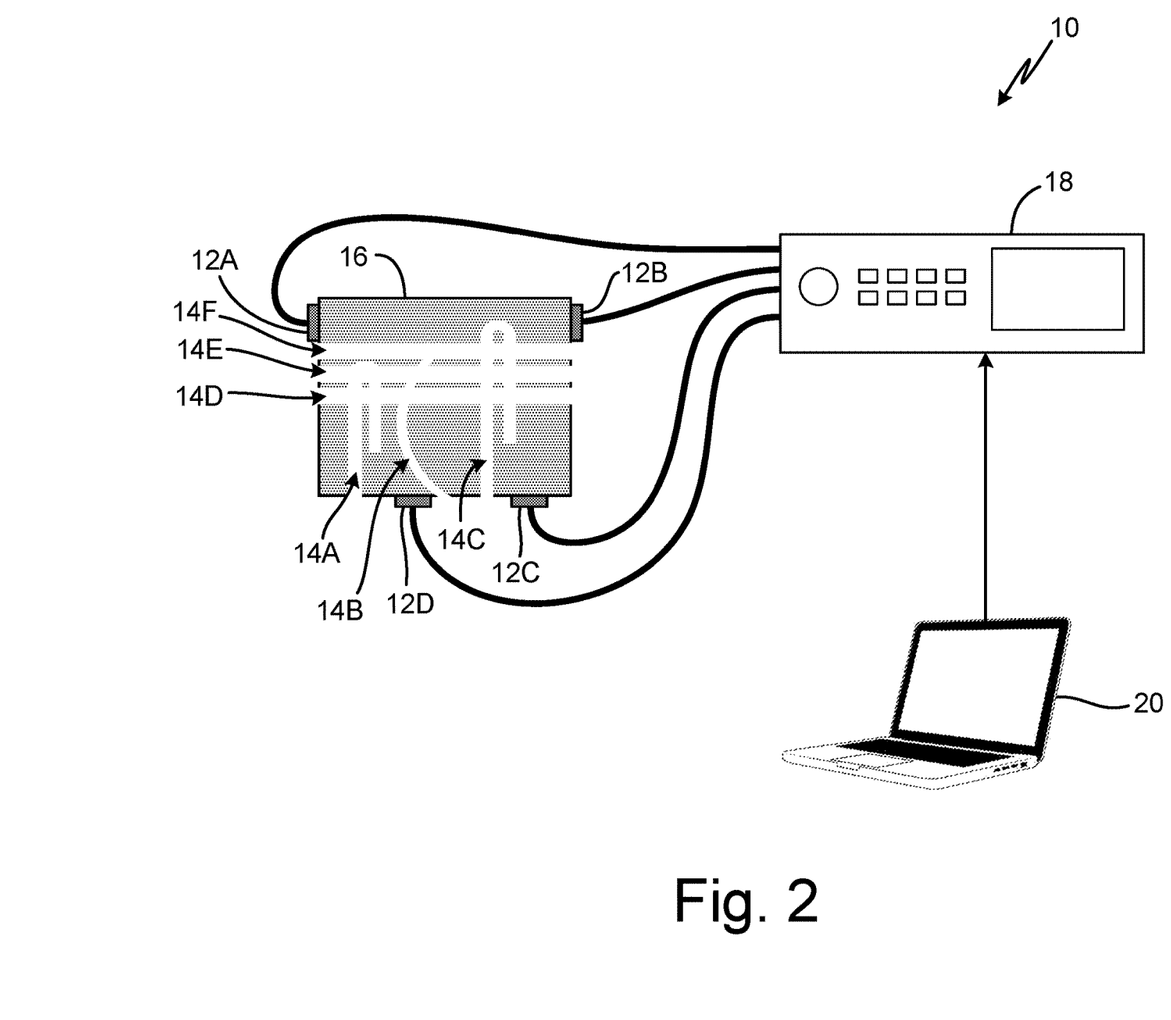
FIG. 2 is a schematic diagram of the example system of FIGS. 1A-1D showing the piezoelectric transducers at different locations.

FIG. 2 is a schematic diagram of system 10 of FIGS. 1A-1D showing piezoelectric transducers 12A-12D attached at different locations to the exterior of additive-manufactured part 16. As illustrated in FIG. 2, each of piezoelectric transducers 12A-12D is attached at a different location (as compared with the locations illustrated in FIGS. 1A-1D). As described above, such location changes of piezoelectric transducers 12A-12D can be based on known orientations and/or path directions of internal passages 14A-14F to facilitate movement of unfused powder through internal passages 14A-14F to exit additive-manufactured part 16. The movement of any one or more of piezoelectric transducers 12A-12D can be repeated multiple times to facilitate the vibration of internal components of additive-manufactured part 16 and movement of unfused powder through internal passages 14A-14F to exit additive-manufactured part 16.

Figure 3:
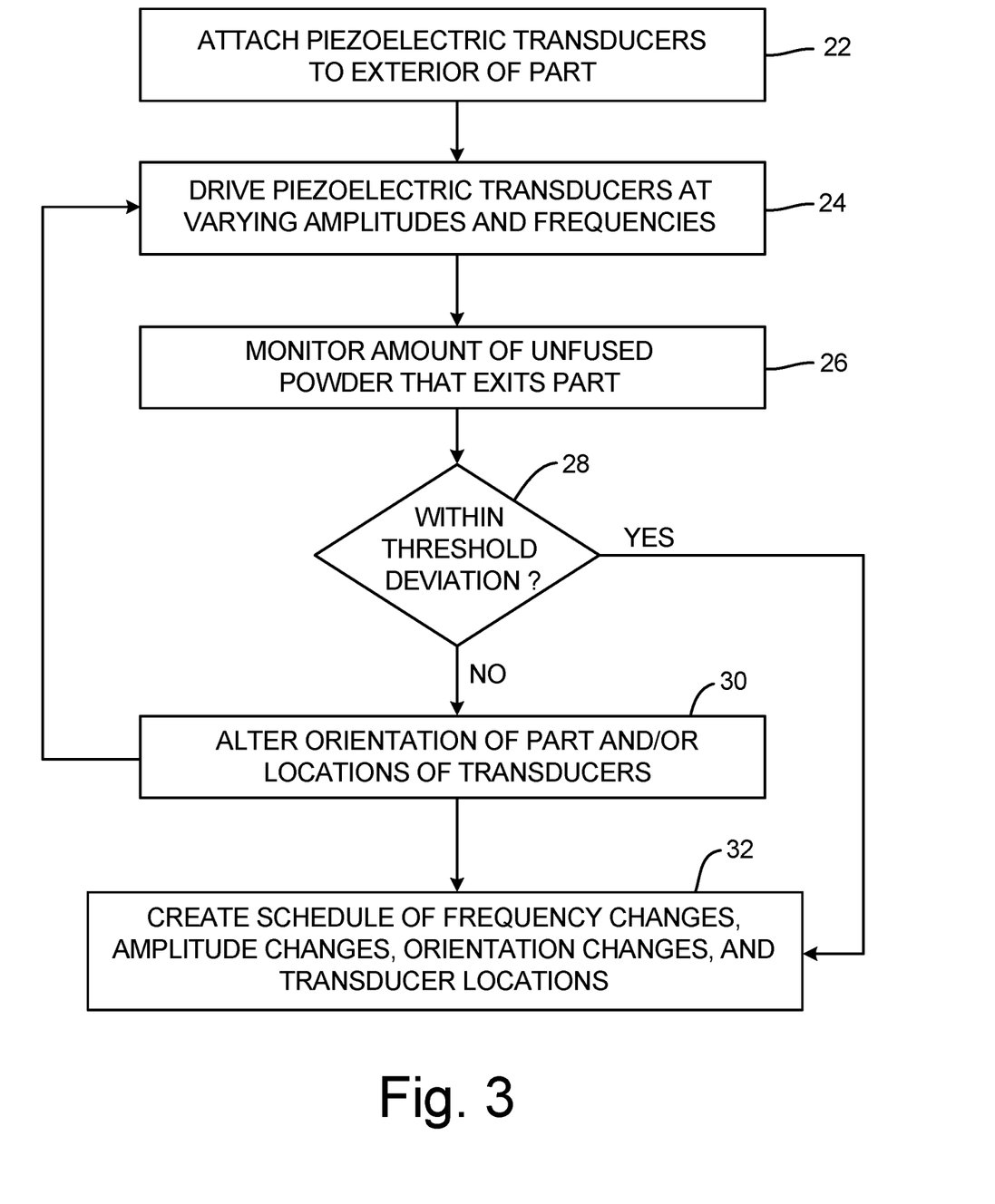
FIG. 3 is a flow diagram illustrating example operations to remove unfused powder from an additive-manufactured part.

FIG. 3 is a flow diagram illustrating example operations to remove unfused powder from an additive-manufactured part. For purposes of clarity and ease of discussion, the example operations are described below within the context of system 10 of FIGS. 1A-1D and FIG. 2.

Piezoelectric transducers are attached to a plurality of locations on an exterior of an additive-manufactured part (Step 22). For example, piezoelectric transducers 12A-12D can be attached to the exterior of additive-manufactured part 16. The additive-manufactured part is vibrated by driving the piezoelectric transducers at varying amplitudes and frequencies (Step 24). For instance, function generator 18 can drive piezoelectric transducers 12A-12D at varying amplitudes and frequencies.

An amount of unfused powder that exits the additive-manufactured part is monitored (Step 26). For example, the amount of unfused (i.e., residual) powder that exits additive-manufactured part 16 can be monitored, such as by collecting the unfused powder and monitoring a weight, volume, or other indication of the amount of unfused powder that has exited additive-manufactured part 16.

It is determined whether the amount of unfused powder that exits the additive-manufactured part is within a threshold deviation from an estimated amount of unfused powder contained within the internal passages of the additive-manufactured part (Step 28). For instance, computer 20 can store a 3D computer model of the structure of additive-manufactured part 16. The estimated amount of unfused powder can be determined based on the volume of internal passages 14A-14F, such as volume equal to or within a threshold percentage of (e.g., 80 percent, 90 percent, or other threshold percentage) of the volume of internal passages 14A-14F. The amount of unfused powder that exits additive-manufactured part 16 can be compared to the estimated amount to determine a deviation (i.e., difference) between the amount of unfused powder that exits additive-manufactured part 16 and the estimated amount. The deviation can be compared to a threshold deviation, such as a threshold volume deviation, a threshold weight deviation, a threshold percentage deviation of volume and/or weight, or other threshold deviations.

In response to determining that the amount of unfused powder that exits the additive-manufactured part is within the threshold deviation from the estimated amount of unfused powder contained within the internal passages of the additive-manufactured part ("YES" branch of Step 28), a defined schedule of frequency changes, amplitude changes, orientation changes, and transducer locations is created (Step 32). The defined schedule corresponds to the frequencies, amplitudes, orientations, and transducer locations utilized during the vibration operations (i.e., Steps 22, 24, and 26) to cause the exit of the amount of unfused powder from additive-manufactured part 16 that is within the threshold deviation. Subsequent additive-manufactured versions of the part can then be subjected to the defined schedule to effectively remove the unfused powder from the additive-manufactured part.

In response to determining that the amount of unfused powder that exits the additive-manufactured part is not within the threshold deviation from the estimated amount of unfused powder ("NO" branch of Step 28), one or more of the orientation of the part and locations of the piezoelectric transducers are altered (Step 30) and the additive-manufactured part is vibrated by driving the piezoelectric transducers at varying amplitudes and frequencies (Step 24). For example, the orientation of additive-manufactured part 16 and/or locations of piezoelectric transducers 12A-12D can be altered individually or in combination to facilitate movement of unfused powder through internal passages 14A-14F to exit additive-manufactured part 16 during vibration of additive-manufactured part 16 via piezoelectric transducers 12A-12D. The execution of Steps 24, 26, 28, and 30 are iterative in nature, and can be performed until the "YES" branch of Step 28 is satisfied or, in certain examples, a threshold number of times (e.g., 5, 10, 50, or more iterations).

Accordingly, techniques of this disclosure can be utilized to remove unfused powder from internal passages of an additive-manufactured part, including those passages that may be prone to trapping unfused powder. The techniques described herein can therefore help to remove residual powder that may otherwise be impractical to remove, thereby increasing the likelihood that parts can feasibly be produced via additive manufacturing techniques.

Discussion of Possible Embodiments

The following are non-exclusive descriptions of possible embodiments of the present invention.

A method of removing unfused powder from internal passages of an additive-manufactured part includes attaching piezoelectric transducers to a plurality of locations on an exterior of the part. The method further includes vibrating the part by driving the piezoelectric transducers at varying amplitudes and frequencies, and monitoring an amount of the unfused powder that exits the part.

The method of the preceding paragraph can optionally include, additionally and/or alternatively, any one or more of the following features, configurations, operations, and/or additional components:

The method can further include altering an orientation of the part and repeating the vibrating step by driving the piezoelectric transducers at the varying amplitudes and frequencies.

Altering the orientation of the part can include altering the orientation of the part based on known orientations of the internal passages within the part.

Altering the orientation of the part based on the known orientations of the internal passages within the part can include identifying the known orientations of the internal passages using a computer model of the part.

Altering the orientation of the part based on the known orientations of the internal passages within the part can include identifying that one or more of the internal passages changes direction within the part.

The method can further include identifying that one or more of the internal passages terminates at a closed end within the part. Altering the orientation of the part can include altering the orientation of the part based on an orientation of the one or more of the internal passages that terminates at the closed end within the part.

Altering the orientation of the part can include altering the orientation of the part based on the amount of the unfused powder that exits the part.

Vibrating the part by driving the piezoelectric transducers at the varying amplitudes and frequencies can include driving the piezoelectric transducers at the varying amplitudes and frequencies using an electronic function generator coupled to the piezoelectric transducers.

The method can further include changing locations of one or more of the piezoelectric transducers and repeating the vibrating step by driving the piezoelectric transducers at the varying amplitudes and frequencies.

Changing the locations of the one or more of the piezoelectric transducers can include changing the locations of the one or more of the piezoelectric transducers based on known orientations of the internal passages within the part.

The method can further include creating a defined schedule of frequency changes, amplitude changes, and piezoelectric transducer locations based upon the monitoring of the amount of the unfused powder that exits the part.

The method can further include identifying an estimated amount of unfused powder contained within the internal passages of the part. Creating the defined schedule can include creating the defined schedule in response to determining that the amount of the unfused powder that exits the part is within a threshold deviation from the estimated amount of unfused powder contained within the internal passages of the part.

Identifying the estimated amount of unfused powder contained within the internal passages of the part can include: determining, using a computer model of the part, a volume of the internal passages within the part; and identifying the estimated amount of unfused powder contained within the internal passages of the part based on the determined volume of the internal passages within the part.

A method includes attaching a plurality of piezoelectric transducers to a plurality of locations of an exterior of an additive-manufactured part having internal passages terminating at one or more open ends at the exterior of the part. The method further includes vibrating the part by driving the plurality of piezoelectric transducers at varying amplitudes and frequencies, and monitoring an amount of unfused powder that exits the one or more open ends at the exterior of the part. The method further includes, in response to determining that the amount of unfused powder that exits the one or more open ends exceeds a threshold deviation from an estimated amount of unfused powder contained within the internal passages of the part: changing at least one of an orientation of the part and locations of one or more of the plurality of piezoelectric transducers; and repeating the vibrating and monitoring steps by driving the plurality of piezoelectric transducers at the varying amplitudes and frequencies and monitoring the amount of unfused powder that exits the one or more open ends at the exterior of the part. The method further includes, in response to determining that the amount of unfused powder that exits the one or more open ends does not exceed the threshold deviation from the estimated amount of unfused powder contained within the internal passages of the part, creating a defined schedule of frequency changes, amplitude changes, orientation changes, and transducer locations associated with the part.

The method of the preceding paragraph can optionally include, additionally and/or alternatively, any one or more of the following features, configurations, operations, and/or additional components:

Changing the at least one of the orientation of the part and the locations of one or more of the plurality of piezoelectric transducers can include changing the at least one of the orientation of the part and the locations of one or more of the plurality of piezoelectric transducers based on known orientations of the internal passages within the part.

The method can further include determining the estimated amount of unfused powder contained within the internal passages of the part based on a known volume of the internal passages of the part.

The method can further include identifying the known volume of the internal passages of the part using a computer model of the part.

Changing the at least one of the orientation of the part and the locations of one or more of the plurality of piezoelectric transducers can include changing, in combination, both the orientation of the part and the locations of one or more of the plurality of piezoelectric transducers.

A system includes an additive-manufacture part comprising a plurality of internal passages, a plurality of piezoelectric transducers, an electronic function generator, and a computer. The plurality of piezoelectric transducers are attached to a plurality of locations on an exterior of the additive-manufactured part. The electronic function generator is electrically coupled to each of the plurality of piezoelectric transducers. The computer is communicatively coupled with the electronic function generator and is encoded with computer-readable instructions that cause the computer to control the electronic function generator to drive the plurality of piezoelectric transducers at varying amplitudes and frequencies to vibrate the additive-manufactured part.

The computer can store a three-dimensional model of the additive-manufactured part defining orientations of the plurality of internal passages. The computer-readable instructions can cause the computer to control the electronic function generator to drive the plurality of piezoelectric transducers at the varying amplitudes and frequencies based on the orientations of the plurality of internal passages defined by the three-dimensional model of the additive-manufactured part.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of removing unfused powder from internal passages of an additive-manufactured part, the method comprising:
   attaching piezoelectric transducers to a plurality of locations on an exterior of the part;
   vibrating the part by driving the piezoelectric transducers at varying amplitudes and frequencies;
   monitoring an amount of the unfused powder that exits the part; and
   creating a defined schedule of frequency changes, amplitude changes, and piezoelectric transducer locations based upon the monitoring of the amount of the unfused powder that exits the part.

2. The method of claim 1, further comprising:
   altering an orientation of the part and repeating the vibrating step by driving the piezoelectric transducers at the varying amplitudes and frequencies.

3. The method of claim 2,
   wherein altering the orientation of the part comprises altering the orientation of the part based on known orientations of the internal passages within the part.

4. The method of claim 3,
   wherein altering the orientation of the part based on the known orientations of the internal passages within the part comprises identifying the known orientations of the internal passages using a computer model of the part.

5. The method of claim 3,
   wherein altering the orientation of the part based on the known orientations of the internal passages within the part comprises identifying that one or more of the internal passages changes direction within the part.

6. The method of claim 2, further comprising:
identifying that one or more of the internal passages terminates at a closed end within the part;
wherein altering the orientation of the part comprises altering the orientation of the part based on an orientation of the one or more of the internal passages that terminates at the closed end within the part.

7. The method of claim 2,
wherein altering the orientation of the part comprises altering the orientation of the part based on the amount of the unfused powder that exits the part.

8. The method of claim 1,
wherein vibrating the part by driving the piezoelectric transducers at the varying amplitudes and frequencies comprises driving the piezoelectric transducers at the varying amplitudes and frequencies using an electronic function generator coupled to the piezoelectric transducers.

9. The method of claim 1, further comprising:
changing locations of one or more of the piezoelectric transducers and repeating the vibrating step by driving the piezoelectric transducers at the varying amplitudes and frequencies.

10. The method of claim 9,
wherein changing the locations of the one or more of the piezoelectric transducers comprises changing the locations of the one or more of the piezoelectric transducers based on known orientations of the internal passages within the part.

11. The method of claim 1, further comprising:
identifying an estimated amount of unfused powder contained within the internal passages of the part;
wherein creating the defined schedule comprises creating the defined schedule in response to determining that the amount of the unfused powder that exits the part is within a threshold deviation from the estimated amount of unfused powder contained within the internal passages of the part.

12. The method of claim 11,
wherein identifying the estimated amount of unfused powder contained within the internal passages of the part comprises:
determining, using a computer model of the part, a volume of the internal passages within the part; and
identifying the estimated amount of unfused powder contained within the internal passages of the part based on the determined volume of the internal passages within the part.

13. A method comprising:
attaching a plurality of piezoelectric transducers to a plurality of locations of an exterior of an additive-manufactured part having internal passages terminating at one or more open ends at the exterior of the part;
vibrating the part by driving the plurality of piezoelectric transducers at varying amplitudes and frequencies;
monitoring an amount of unfused powder that exits the one or more open ends at the exterior of the part;
in response to determining that the amount of unfused powder that exits the one or more open ends exceeds a threshold deviation from an estimated amount of unfused powder contained within the internal passages of the part:
  changing at least one of an orientation of the part and locations of one or more of the plurality of piezoelectric transducers; and
  repeating the vibrating and monitoring steps by driving the plurality of piezoelectric transducers at the varying amplitudes and frequencies and monitoring the amount of unfused powder that exits the one or more open ends at the exterior of the part; and
in response to determining that the amount of unfused powder that exits the one or more open ends does not exceed the threshold deviation from the estimated amount of unfused powder contained within the internal passages of the part:
  creating a defined schedule of frequency changes, amplitude changes, orientation changes, and transducer locations associated with the part.

14. The method of claim 13,
wherein changing the at least one of the orientation of the part and the locations of one or more of the plurality of piezoelectric transducers comprises changing the at least one of the orientation of the part and the locations of one or more of the plurality of piezoelectric transducers based on known orientations of the internal passages within the part.

15. The method of claim 13, further comprising:
determining the estimated amount of unfused powder contained within the internal passages of the part based on a known volume of the internal passages of the part.

16. The method of claim 15, further comprising:
identifying the known volume of the internal passages of the part using a computer model of the part.

17. The method of claim 13,
wherein changing the at least one of the orientation of the part and the locations of one or more of the plurality of piezoelectric transducers comprises changing, in combination, both the orientation of the part and the locations of one or more of the plurality of piezoelectric transducers.

* * * * *